May 5, 1964 R. E. COX 3,131,773
SEMIAUTOMATIC MARKER
Filed July 11, 1962 2 Sheets-Sheet 1

INVENTOR.
ROBERT E. COX
BY
AGENT

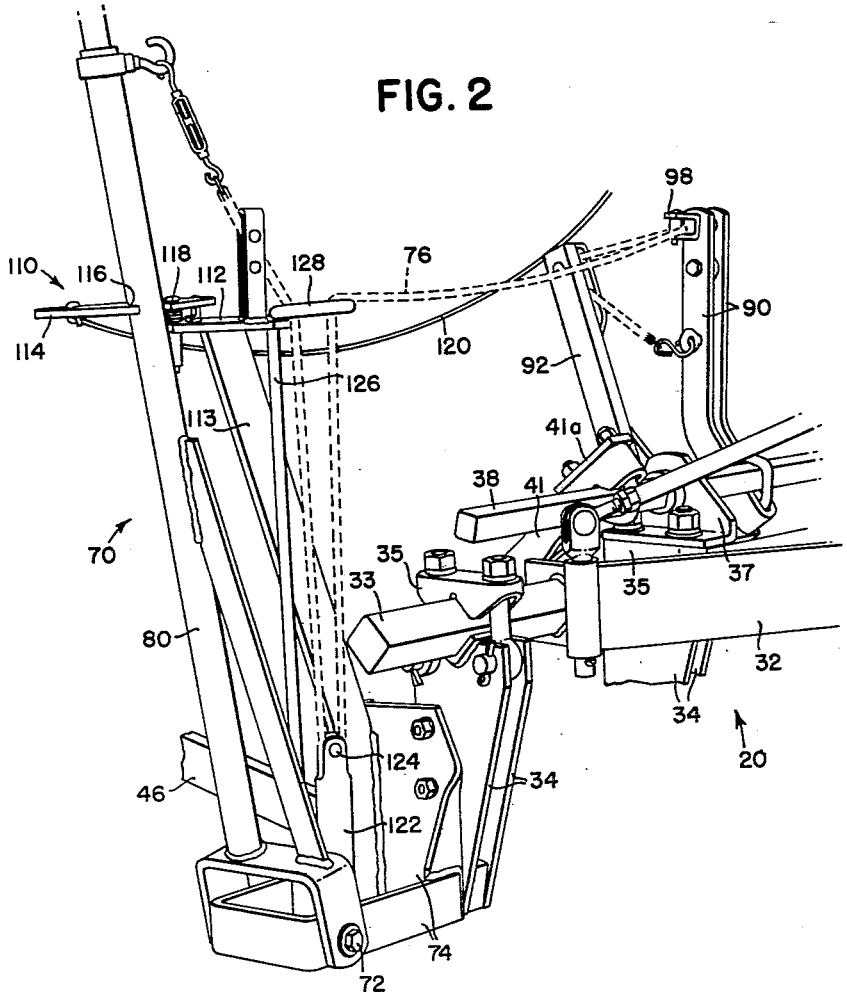
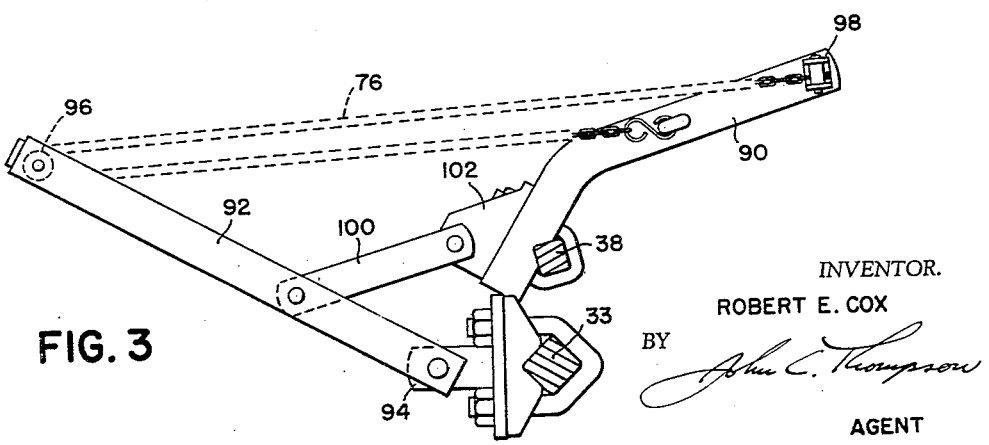

United States Patent Office 3,131,773
Patented May 5, 1964

3,131,773
SEMIAUTOMATIC MARKER
Robert E. Cox, Moline, Ill., assignor to Deere & Company, Moline, Ill., a corporation of Delaware
Filed July 11, 1962, Ser. No. 209,164
9 Claims. (Cl. 172—126)

The present invention relates generally to agricultural implements and more particularly to ground working and ground engaging implements, such as for example a planter or lister, having row marking means.

The object and general nature of the present invention is the provision of a new and improved semiautomatic marker for implements of the type that are adapted to be carried by a tractor and raised and lowered by the latter into and out of transport and working positions, with means responsive to the movement of the implement relative to the tractor for automatically raising and lowering the markers under the selective control of the operator.

More specifically, it is an object of this invention to provide new and improved automatic means for raising a marker from its marking position to a latched position when the ground engaging implements are raised from their ground engaging position. A still further object of this invention is to provide in an implement having ground engaging means which are shiftable from a ground engaging position to a position out of engagement with the ground in response to rotation of the rockshaft, and means mounted on the rockshaft and cooperable with a pivoted arm mounted on the implement frame to raise the marker from its marking position to an elevated position in response to rotation of the rockshaft to raise the ground engaging means.

Another object of this invention is to provide means to raise a marker mounted on an implement having ground engaging means which can be moved from a ground engaging position to a position out of engagement with the ground in response to rotational movement of a rockshaft mounted on the implement, said means including an arm fixed on the rockshaft, an arm pivotally mounted on the implement frame, sheaves mounted on the outer ends of said arms, a marker chain interconnecting said marker and said arms, and means to move the arms away from each other during raising of the ground engaging means.

Another object of this invention is to provide means to take up the slack in marker chain when the marker is latched in its raised position and the ground engaging means are in their ground engaging position.

Another object of this invention is to provide automatic means for raising markers on an implement having ground engaging means in response to the lifting of the ground engaging means, the means being reliable, of rugged construction, and low in cost.

These and other objects and advantages of the present invention will be apparent to those skilled in the art after a consideration of the following detailed description, taken in conjunction with the accompanying drawings, in which:

FIG. 2 is a detailed view of a portion of the implement shown in FIG. 1, in which the marker is held in its latched upright position and the ground engaging means are in their ground engaging position.

FIG. 3 is a side view of applicant's novel marker raising means.

Figure 1:
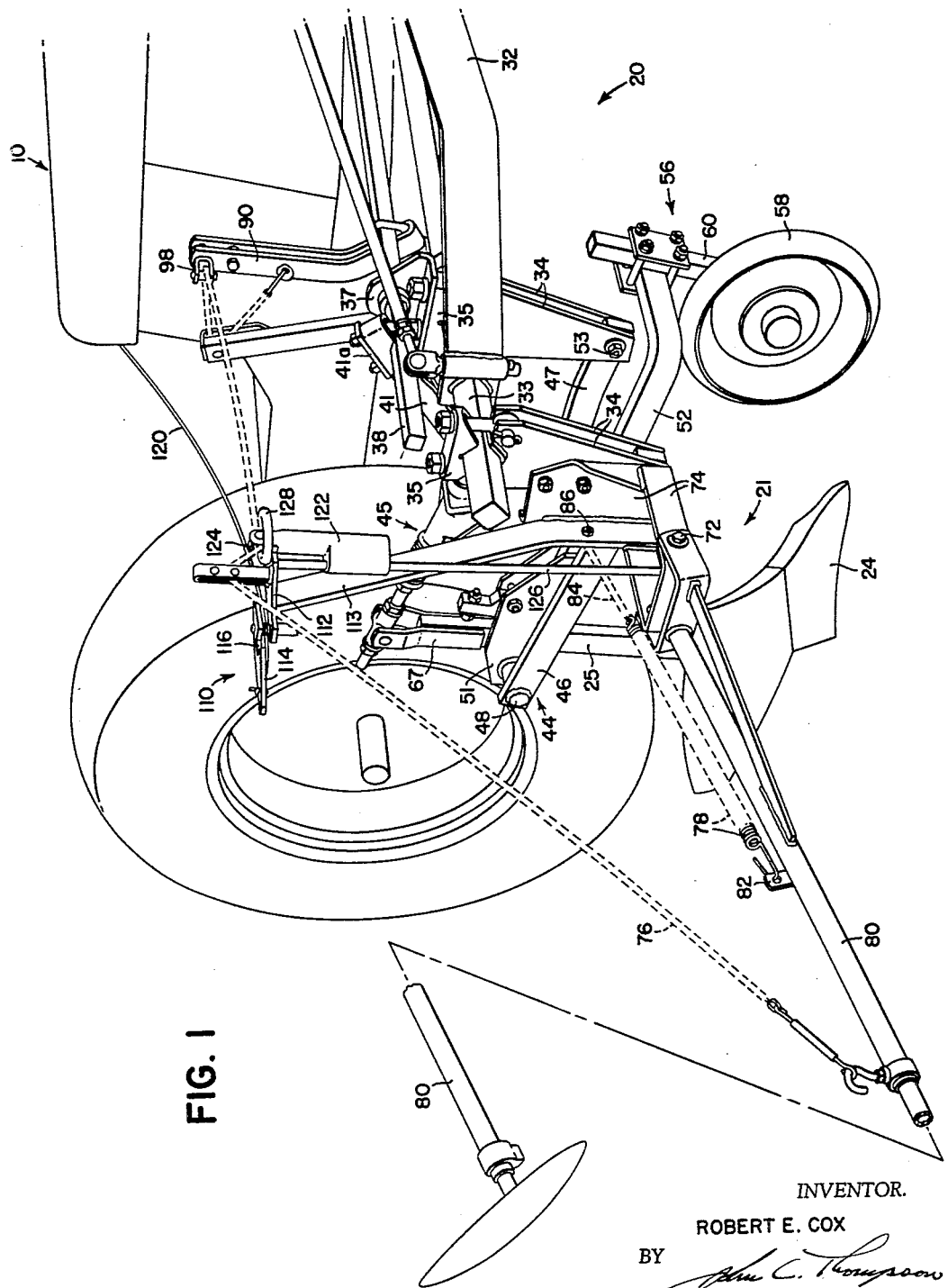
FIG. 1 is a perspective view of a tractor mounted implement in which the principles of the present invention have been incorporated, the marker and the ground engaging means both being in their ground engaging position.

Referring first to FIG. 1 an implement 20 is shown mounted on a tractor 10. The implement includes a plurality of ground working units 21 (only one of which is shown), each unit including a bedder bottom 24 connected to a vertical beam 25. The implement 20 also includes a frame section 32 for connecting the ground working means to the tractor 10 and a transverse square bar 33 to which depending brackets 34 are connected by clamp means 35, the upper end of the brackets 34 and the associated clamp means 35 being shaped to conform to the tool bar 33. Mounted on the inner clamp means 35 are rockshaft supporting bracked means 37, the rockshaft bracket means carrying suitable bearing means in which a rockshaft 38 is supported.

Each of the ground working units 21 comprises not only the associated bedder bottom 24 and the vertical beam 25 mentioned above, but also a pair of generally parallel lower and upper links 44 and 45. The rear portion of each of the upper links 45 is pivoted to straps 67 fixed to the upper portion of beam 25, and the forward ends of the upper links 45 are pivotally secured to upper portions of the depending brackets 34. Each lower link member is made up of a pair of bars 46 and 47. The laterally outer bar 46 is pivotally connected at its rear end by pin or shaft 48 to bracket means 51 fixedly carried by the associated beam 25. The rear end of bar 47 is also pivotally connected to shaft or pin 48 and bars 46 and 47 are pivotally connected at their forward ends (as at 53) to depending brackets 34.

A gage wheel unit 56 is provided directly ahead of each of the lister bottoms 24. Each gage wheel unit includes a ground engaging wheel 58 journaled at the lower end of the vertical standard 60 that is secured to one end of a generally fore-and-aft extending bar 52, the rear portion of which is pivoted to the bracket means 51. A plurality of arms 41 (only one of which is shown) are fixed by clamp means 41a to the rockshaft 38, there being one arm above each ground working unit 21. The other end of the lift arm means 41 is connected with the associated lower link 44 by a chain or other suitable means, not illustrated, and rotational movement of the rockshaft 38 will cause the ground engaging elements 24 to be raised out of engagement with the ground.

The implement described above, by itself, does not form a part of the present invention, and is more completely described in U.S. Patent No. 3,063,504 to Oerman et al.

According to the principles of the present invention a marker, indicated generally at 70, is pivotally secured as at 72 to transversely extending mounting means 74, which are in turn rigidly secured to the outermost depending bracket 34. The marker is adapted to be swung from a ground marking position, as illustrated in FIG. 1, to an upright position as illustrated in FIG. 2 by means of a marker chain 76. A spring 78 (FIG. 1) is employed to counterbalance the weight of the marker arm 80 and is secured to an intermediate portion of the arm by means of a bracket 82 or any suitable means and the other end of the spring 78 is secured by chain 84 to pivot point 86. One end of the marker chain 76 is secured to an intermediate portion of the marker arm 80, and the other end of the chain 76 is secured to arm 90, which in turn is rigidly secured to the rockshaft 38.

A second arm 92 is pivotally secured to bracket means 94 (FIG. 3) and carries adjacent its outer end sheave means 96 through which a portion of the marker chain 76 passes. Sheave means 98 are also provided on the end of the first arm 90 and through which another portion of the marker chain 76 passes. A link 100 is pivotally secured at one end to the second arm 92 and is also pivoted at its other end to a bracket 102 which in turn is secured to the first arm 90.

In operation, when the ground engaging elements 24 are raised by rotating the rockshaft 38 in a clockwise direction as viewed in FIG. 3, the arm 90 is swung forwardly parallel to the tractor, and the arm 92 is moved rearwardly from the position indicated in FIG. 1 to the position indicated in FIG. 3 by means of the link 100. This action causes the length of the chain between sheave 98 and the marker arm 80 to be considerably shortened, thereby raising the arm into the position shown in FIG. 2. When the ground engaging means are lowered into their ground engaging position the arm 90 is then swung rearwardly to the position shown in FIGS. 1 and 2, and the arm 92 is pulled forwardly by means of the link 100.

It may be desired during the operation of the implement to have the ground engaging means 24 in a ground engaging position while having the marking means held in a raised position out of engagement with the ground. To hold the marker in its raised position, a manually operated latch 110 is provided which is mounted on a plate 112. The plate 112 is secured to the implement frame by means of an upstanding bracket 113 which is secured to the mounting means 74. The latch is provided with a cam surface 114 and a marker arm engaging slot 116. A spring 118 normally biases the latch into its latching position.

In operation when the marker arm is raised it engages the cam surface 114 and forces the latch rearwardly until the arm can be received by the slot 116, at which time the spring biases the latch into its latching position. Once the ground engaging elements have been lowered into their ground engaging position it is necessary to release the latch manually by pulling on the rope 120 to cause the latch to open thereby permitting the marker to fall into a marking position.

When the marker is in its raised position and the ground engaging elements are in their down or ground engaging position, there is considerable slack in the marker chain. In order to prevent the marker chain from becoming fouled, applicant has provided a novel means for taking up the slack in the chain. This means includes a weight 122 which is provided with a sheave 124 in its upper portion to receive the marker cable. A guide rod 126 is secured at its upper portion to the plate 112 and extends downwardly therefrom. Mounted adjacent the plate 112 is a ring or marker chain guide means 128. The weight is provided with an aperture and is slidable about the guide rod 126. When the marker is up and the ground engaging elements are down the weight 122 draws an intermediate portion of the marker chain downwardly as illustrated in FIG. 2 and thus keeps the marker chain taut and free from fouling. However, after the latch 110 has been released and the marker drops to its ground engaging position, the weight of the marker which is considerably greater than the weight of weight 122, will draw the weight 122 up into the position shown in FIG. 1.

While I have shown and described above the preferred structuree in which principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. An implement comprising a frame, ground engaging means mounted on the frame, means to raise the ground engaging means from a ground engaging position to an elevated position, marking means swingably mounted on the frame and adapted to be swung from an operative marking position upwardly to an inoperative position, a marker chain having one end secured to the marking means, first arm means to which the other end of the marker chain is secured, second arm means carrying a sheave over which a portion of the marker chain passes, one of said arms being connected to said raising means and adapted to be moved away from the other of said arms when the ground engaging means is moved from its ground engaging position to its elevated position, and means interconnecting said arms and responsive to the movement of said one arm away from the other arm to move the other of said arms away from said one arm whereby the movement of the arms away from each other causes the marking means to be raised to its inoperative position.

2. An agricultural implement adapted to be mounted transversely with respect to a tractor and comprising a frame, ground engaging means mounted on the frame, means to raise the ground engaging means from a ground engaging position to an elevated position, marking means swingably mounted on the frame and adapted to be swung from an operative marking position upwardly to an inoperative position, a marker chain having one end secured to the marking means, first arm means tow hich the other end of the marker chain is secured, said first arm means carrying a first sheave over which a portion of the marker chain passes, second arm means carrying a second sheave over which another portion of the marker chain passes, the portion of the marker chain passing over the second sheave being intermediate to that portion of the marker chain which passes over the first sheave and the end of the marker chain which is secured to the first arm, one of said arms being connected to said raising means and adapted to be moved longitudinally away from the other of said arms when said ground engaging means is moved from its ground engaging position to its raised position, the other of said arms being swingably mounted on said implement for longitudinal swinging movement, and means interconnecting said arms in response to the longitudinal movement of said one arm away from the other of said arms to cause said other arm to be swung away from said one arm whereby the movement of the arms away from each other causes the marking means to be raised to its inoperative position.

3. An agricultural implement adapted to be mounted transversely with respect to a tractor and comprising a frame, ground engaging means mounted on the frame, rockshaft means on said frame and adapted to raise said ground engaging means from a ground engaging position to an elevated position, marking means mounted on the frame for transverse swinging movement and adapted to be swung from an operative marking position upwardly to an inoperative position, a marker chain having one end secured to the marking means, first arm means to which the other end of the marker chain is secured, said first arm means carrying a first sheave over which a portion of the marker chain passes, second arm means swingably mounted on said frame for longitudinal movement rearwardly of said first arm, said second arm carrying a second sheave over which another portion of the marker chain passes, the portion of the marker chain passing over the second sheave being intermediate that portion of the marker chain which passes over the first sheave and the end of the marker chain which is secured to the first arm, said first arm being connected to said rockshaft means and adapted to be moved longitudinally away from the second arm when said ground engaging means is moved from its ground engaging position to its raised position, the second arm being swingably mounted on said implement frame for longitudinal swinging movement, and means interconnecting said arms in response to the longitudinal movement of said first arm away from the second arm to cause the second arm to be swung away from the first arm whereby the movement of the arms away from each other causes the marking means to be raised to its inoperative position.

4. The invention set forth in claim 3 in which the means interconnecting said arms comprises a link, one end of the link being pivotally secured to said second arm, and the other end of said link being pivotally secured to means mounted on said rockshaft.

5. In a ground working implement of the type having a frame, ground engaging means mounted on the frame for movement from a first ground engaging position to a second position out of engagement with the ground, and a marker swingably connected to said frame for movement from a first ground engaging position to a second position out of engagement with the ground, the improvement comprising means responsive to the movement of the ground engaging means from its first position to its second position to raise said marker from its first position to its second position, said means including a rockshaft mounted on said frame, means interconnecting the rockshaft to the ground working means whereby rotation of the rockshaft in one direction will move the ground working means from the first position to the second position, a first arm having one end secured to said rockshaft, a second arm having one end swingably mounted on said frame, a marker chain having one end secured to the marker and the other end fixed to said first arm, a first sheave on the first arm, a second sheave on the second arm, portions of the marker chain passing through said sheaves, that portion of the marker chain passing through the second sheave being between the end fixed to the first arm and that portion which passes through the first sheave, a link, means pivotally securing the first end of the link adjacent one end of the first arm, and means pivotally securing the second end of the link to said second arm, the parts being so arranged and constructed that rotation of the rockshaft in said one direction to raise the ground engaging means to its second position causes the first arm to be moved away from the second arm and the second arm to be moved away from the first arm thereby causing the marker to be raised.

6. Apparatus for taking up the slack in a chain for a semi-automatic marker swingably mounted on an implement having a frame, ground engaging means mounted on the frame and movable into and out of a ground engaging position, and manually operable latch means adapted to hold the marker in a raised position when the ground engaging means are in their ground engaging position, said apparatus comprising a weight, vertically extending weight guide means adapted to be mounted on the frame and to guide said weight, a sheave mounted on said weight and adapted to receive said marker chain, and a marker chain guide means mounted adjacent an upper portion of said weight guide means and adapted to receive said marker chain and maintain that portion of the marker chain between said weight and said marker chain guide means substantially vertical when said marker is in its raised position and said ground engaging means are in their ground engaging position.

7. The invention set forth in claim 6 in which said weight guide means is a vertically extending rod, and said marker chain guide means is a horizontally disposed ring secured to the upper end of said rod.

8. The invention set forth in claim 2 further characterized by latch means mounted on the frame and operable to hold the marker in its raised position when the ground engaging means are in a ground engaging position, and means mounted on the frame to take up the slack in the marker chain when the marker is in its raised position and the ground engaging means are in their ground engaging position, said last-mentioned means including a weight, vertically extending weight guide means mounted on the frame, a portion of said guide means being disposed within a portion of said weight, a sheave mounted on said weight and receiving said marker chain, and a marker chain guide means mounted adjacent an upper portion of said weight guide means and adapted to receive said marker chain and maintain that portion of the marker chain between said chain guide means and said weight substantially vertically when said marker is in its raised position and said ground engaging means are in their ground engaging position.

9. An implement comprising a frame, ground-engaging means mounted on the frame, means to raise the ground-engaging means from a ground-engaging position to an elevated position, marking means swingably mounted on the frame and adapted to be swung from an operative position upwardly to an inoperative position, a marker chain having one end secured to the marking means, first arm means to which the other end of the marker chain is secured, second arm means carrying a sheave over which a portion of the marker chain passes, one of said arms being connected to said raising means and adapted to be moved away from the other of said arms when the ground-engaging means is moved from its ground-engaging position to its elevated position, the other of said arm means being swingably connected to the frame, and link means interconnecting said arms and responsive to the movement of said one arm away from the other arm to cause the other arm to be swung away from said one arm whereby the movement of the arms away from each other causes the marking means to be raised to its inoperative position.

References Cited in the file of this patent
UNITED STATES PATENTS

| | | |
|---|---|---|
| 2,584,200 | Hand et al. | Feb. 5, 1952 |
| 2,748,686 | Nelson et al. | June 5, 1956 |
| 2,975,840 | Sorensen et al. | Mar. 21, 1961 |
| 2,975,841 | Oehler et al. | Mar. 21, 1961 |